(12) United States Patent
Mulato (10) Patent No.: US 9,428,154 B2
(45) Date of Patent: Aug. 30, 2016

(54) DEVICE FOR REPLACING A BATTERY THAT POWERS A MOTOR THAT DRIVES A MOTOR VEHICLE

(75) Inventor: Gilles Mulato, Chatillon (FR)

(73) Assignee: RENAULT s.a.s., Boulogne Billancourt (FR)

( * ) Notice: Subject to any disclaimer, the term of this patent is extended or adjusted under 35 U.S.C. 154(b) by 479 days.

(21) Appl. No.: 13/509,445

(22) PCT Filed: Oct. 18, 2010

(86) PCT No.: PCT/FR2010/052211
§ 371 (c)(1),
(2), (4) Date: Jun. 14, 2012

(87) PCT Pub. No.: WO2011/058256
PCT Pub. Date: May 19, 2011

(65) Prior Publication Data
US 2012/0251281 A1 Oct. 4, 2012

(30) Foreign Application Priority Data

Nov. 12, 2009 (FR) ...................... 09 57957

(51) Int. Cl.
*B60S 5/06* (2006.01)
*B60L 11/18* (2006.01)
(Continued)

(52) U.S. Cl.
CPC .............. *B60S 5/06* (2013.01); *B60L 11/1822* (2013.01); *B60L 11/1877* (2013.01); *B60L 11/1879* (2013.01); *H01M 2/1083* (2013.01); *B60K 2001/0472* (2013.01); *B60L 2200/26* (2013.01); *Y02T 10/705* (2013.01); *Y02T 10/7005* (2013.01); *Y02T 10/7072* (2013.01); *Y02T 90/124* (2013.01); *Y02T 90/14* (2013.01); *Y10T 29/53* (2015.01)

(58) Field of Classification Search
CPC .............. B60K 2001/0455; B60K 2001/0472; B60K 1/04; B60S 5/06; B60L 11/1822; B60L 11/1877
USPC ......... 104/37; 180/65.1, 68.5; 320/104, 109; 414/267, 281, 331.02, 390, 398, 809, 414/589
See application file for complete search history.

(56) References Cited

U.S. PATENT DOCUMENTS 5,559,420 A * 9/1996 Kohchi ..................... 180/68.5
5,612,606 A * 3/1997 Guimarin et al. ........... 320/109
(Continued)

FOREIGN PATENT DOCUMENTS

DE 10 2007 032 210 10/2008
FR 2 335 961 7/1977

OTHER PUBLICATIONS

International Search Report Issued Mar. 2, 2011 in PCT/FR10/052211 filed Oct. 18, 2010.
(Continued)

*Primary Examiner* — Ernesto Suarez
*Assistant Examiner* — Ronald Jarrett
(74) *Attorney, Agent, or Firm* — Oblon, McClelland, Maier & Neustadt, L.L.P (57) ABSTRACT

A tool box device for locking and/or unlocking a battery that powers a motor that drives a motor vehicle, including a support housing, a movement transmission system including at least one gear box and at least one transmission shaft, connected to at least one system for engaging a battery locking/unlocking mechanism.

18 Claims, 6 Drawing Sheets

(51) Int. Cl.
*H01M 2/10* (2006.01)
*B60K 1/04* (2006.01)

(56) References Cited

U.S. PATENT DOCUMENTS

| | | | |
|---|---|---|---|
| 7,993,155 B2* | 8/2011 | Heichal et al. | 439/374 |
| 2006/0214634 A1 | 9/2006 | Baba | |
| 2007/0113921 A1* | 5/2007 | Capizzo | B60K 15/063 141/231 |
| 2007/0286674 A1* | 12/2007 | Khoshnevis | 403/345 |
| 2009/0314382 A1 | 12/2009 | Capizzo | |
| 2010/0145717 A1* | 6/2010 | Hoeltzel | B60K 1/04 705/1.1 |
| 2012/0097489 A1* | 4/2012 | Ecochard | 187/401 |

OTHER PUBLICATIONS

French Search Report Issued Jul. 7, 2010 in French Patent Application 0957957 filed Nov. 12, 2009.

\* cited by examiner

DEVICE FOR REPLACING A BATTERY THAT POWERS A MOTOR THAT DRIVES A MOTOR VEHICLE

BACKGROUND

The present invention relates to an actuating device for locking and/or unlocking a container of energy, of the battery type, for an electric motor vehicle. Hereinafter, the term battery will be used for the purposes of simplicity. The invention also relates to a system for replacing a battery or any container of energy of a motor vehicle including such an actuating device and to a station for replacing a battery using such a system. Finally, it relates to a method of replacing an energy container using such an actuating device.

Certain motor vehicles, such as electric or hybrid vehicles, comprise a battery that powers an electric drive motor. It may prove advantageous to exchange this battery, when its level of energy is low, for a new fully charged battery. This can be done in a station similar to a service station in which a motor vehicle can have its fuel tank filled.

Document U.S. Pat. No. 5,612,606 discloses a station for exchanging the electric battery that powers a motor that drives an electric vehicle and a method for performing such an exchange. In the exchange station described, the driver positions the vehicle approximately in a rail, against a longitudinal end stop with respect to equipment belonging to the station. After that, in phases that are fairly well automated, mobile means for removing the electric battery and for assembling the new battery in the vehicle position themselves relative to the vehicle using sensors.

One difficulty in setting up such a battery exchange concept is that there are a great many motor vehicles that may carry batteries of different types, fixed to the motor vehicle in different ways. Now, it is not economically conceivable to have a proliferation of automatic devices for removing and replacing these different types of battery or to set in place a manual solution, because of the cost of this and the weight of the batteries.

Hence, to make it easy to roll out battery exchange stations (requiring little by way of technological competence), it is necessary to make these stations operate reliably, robustly, flexibly and universally.

BRIEF SUMMARY

Thus it is an object of the invention to provide a solution for replacing a battery that meets the abovementioned objectives.

The concept of the invention relies on a universal and standard device comprising tools involved in actuating the mechanisms used for locking and/or unlocking a battery fitted to a motor vehicle, which in order to make the description simpler, we shall refer to as a "toolbox".

More specifically, the invention relates to a toolbox device for enacting the locking and/or unlocking of a battery that powers a motor that drives a motor vehicle, characterized in that it comprises a support unit, a movement transmission system comprising at least one relay gearbox and at least one transmission shaft, connected to at least one battery locking/unlocking mechanism grasping system.

The toolbox device may comprise at least one motor and an interface for the electrical connection thereof.

The toolbox device may comprise at least one interface for connection with an external motor so that movement can be transmitted from the external motor to at least one grasping system.

The interface for connection with an external motor may comprise a connecting unit and an internal relay gearbox.

The toolbox device may comprise an interface for handling it.

The toolbox device may comprise two motors.

The toolbox device may comprise four grasping systems positioned in the corners of the substantially rectangular support unit, the at least one motor being positioned in a central region of the support unit.

In addition, the support unit of said toolbox device may advantageously comprise a cavity intended to fit into a ball end of a lifting system for lifting said toolbox device. Thus, the toolbox device is mounted with the ability to rotate on the lifting system and can position itself in a plane parallel to the bottom plane of the battery that is to be replaced, making it easier for the grasping systems of the toolbox device to gain a firm purchase on the locks of the battery.

The invention also relates to a system for replacing a battery of a motor vehicle, characterized in that it comprises a toolbox device as described hereinabove and a lifting device for lifting this toolbox device, allowing it to be moved vertically.

The lifting device may further comprise a movement system which comprises a means for moving horizontally along a rail in order to bring the toolbox device under the battery of a motor vehicle, said lifting device comprising a means for moving the toolbox device vertically in order to bring it into contact with the battery in order to unlock it.

The lifting device may be a robot and the toolbox device may comprise a handle via which the robot can handle it.

Advantageously, said lifting system may comprise a ball end intended to reference said toolbox device with respect to said battery.

The system for replacing a battery of a motor vehicle may comprise car bearer bars associated with the toolbox device to improve the stability and precision of the positioning against the motor vehicle in order to carry out the locking and unlocking of the battery thereof.

The invention also relates to a station for replacing a battery that powers a motor that drives a motor vehicle, characterized in that it comprises a system for replacing a battery of a motor vehicle as described hereinabove.

The invention also relates to a method for replacing a battery of a motor vehicle, characterized in that it comprises the following steps:
  positioning a toolbox device as described hereinabove under the battery of a motor vehicle;
  lifting the toolbox device vertically until it connects with the battery;
  actuating the toolbox device in order to unlock the battery from the motor vehicle;
  lowering the toolbox device bearing the unlocked battery;
  taking the unlocked battery away.

Advantageously, said step of actuating the toolbox device is preceded by a step of rotating said toolbox device, positioning said support unit in a plane parallel to the bottom plane of said battery.

The method for replacing a battery of a motor vehicle may comprise the following additional steps:
  positioning a toolbox device bearing a battery under the motor vehicle;
  lifting the toolbox device vertically until the battery is positioned in its housing provided within the motor vehicle;
  actuating the toolbox device to lock the battery to the motor vehicle;
  taking the toolbox device away.

BRIEF DESCRIPTION OF THE DRAWINGS

These objects, features and advantages of the present invention will be explained in detail in the following description of one particular embodiment given by way of nonlimiting example with reference to the attached figures among which.

DETAILED DESCRIPTION

The concept behind the invention relies on what is referred to as a "toolbox" device which comprises a certain number of components that are standard and modular so as to obtain a device suited to intervention on all types of batteries and all motor vehicles.

Figure 1:
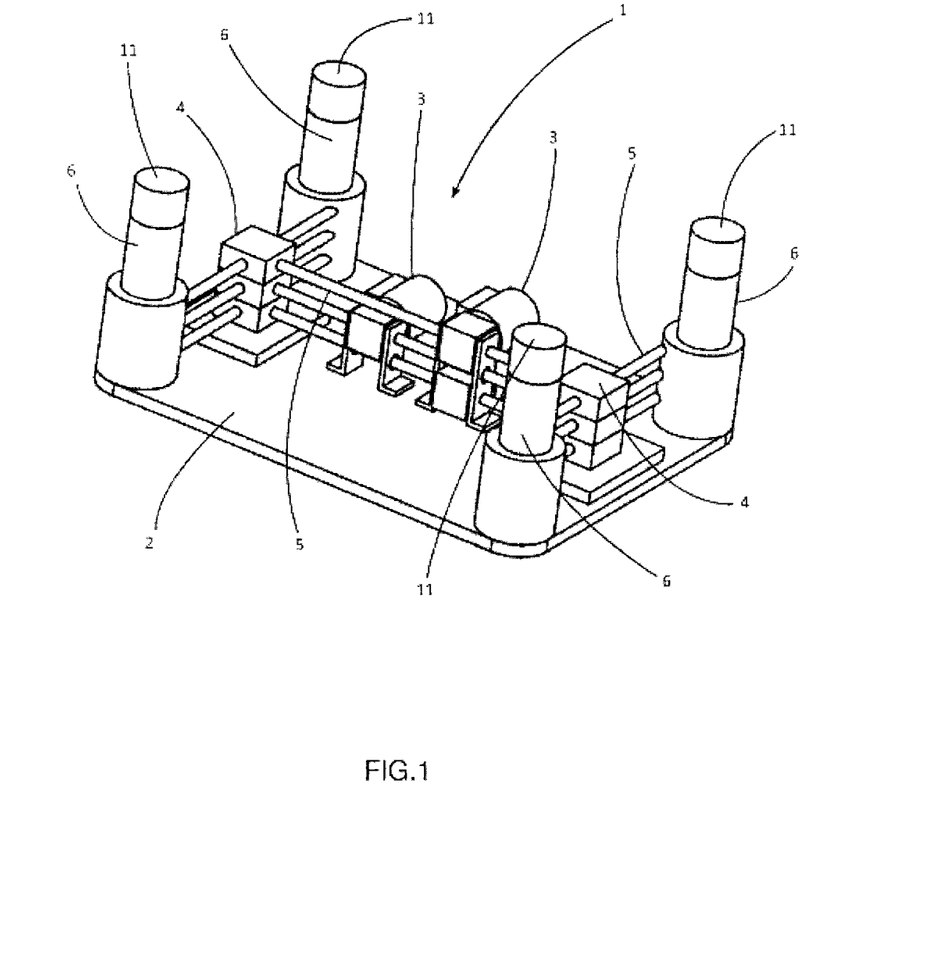
FIG. 1 is a perspective depiction of a toolbox according to one embodiment of the invention.
Figure 2:
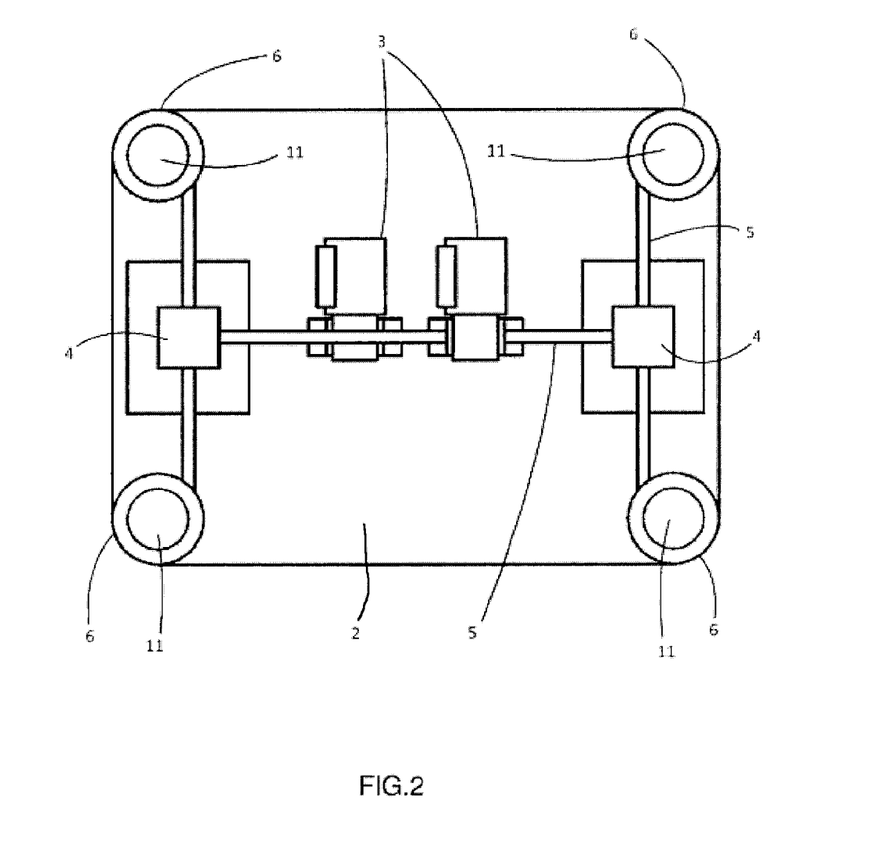
FIG. 2 is a view from above of the toolbox according to the embodiment of the invention.

FIGS. 1 and 2 depict a toolbox 1 according to one embodiment of the invention. This set of actuating tools, or toolbox, 1, comprises a support unit 2, the function of which is to support the various components of the device, two simple and standard motors 3, arranged in a central region of the support unit 2, relay gearboxes 4 and transmission shafts 5, which may include angular-offset systems such as universal joints. The function of the relay gearboxes 4 and of the transmission shafts 5 is to transmit a drive movement initiated by the motors 3 to four locking-mechanism grasping systems 6 positioned at the four corners of the substantially rectangular-shaped support unit 2, and the function of which is to actuate the mechanisms that lock and unlock a battery. These locking-mechanism grasping systems 6 are in cylindrical form, extending above the top surface of the support unit 2, so that their top ends 11 can connect with the locks of a battery. Finally, the device comprises an electrical connection for powering the motors, and an interface for grasping the toolbox, so as to allow a device to handle the toolbox in order to position it correctly against a motor vehicle and be able to lock and unlock the battery thereof, as will be explained later on.

Figure 3:
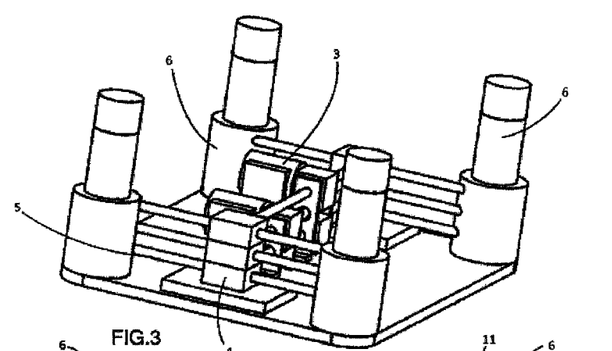
FIG. 3 is a perspective depiction of the details of the toolbox according to the embodiment of the invention.

FIG. 3 is a more close-up perspective depiction of the toolbox clearly showing its two motors 3, relay gearboxes 4, transmission shafts 5 and locking-mechanism grasping systems 6.

Figure 4:
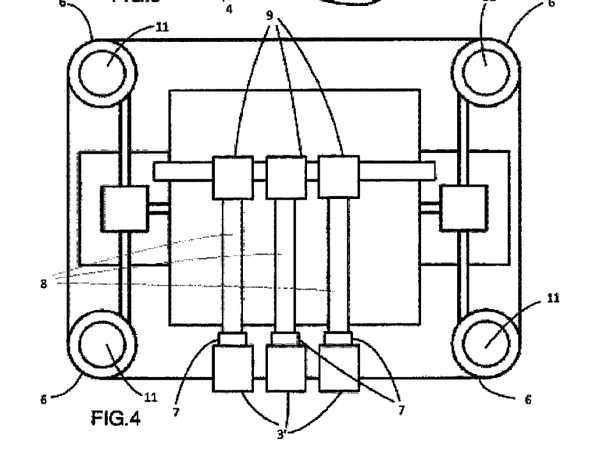
FIG. 4 is a view from above of an alternative for the embodiment of the toolbox of the invention.

FIG. 4 depicts an alternative form of embodiment of the toolbox according to the invention whereby three motors 3' are positioned on the outside of the toolbox. The latter is then equipped with an interface allowing the movement initiated by these external motors 3' to be transmitted as far as the locking-mechanism grasping systems 6. This interface consists of connection units 7, transmission shafts 8 leading to internal relay gearboxes 9.

Of course, the invention is not restricted to the embodiments described hereinabove. In particular, the toolbox 1 may comprise a different number of motors 3, preferably between three and six motors. In general, this number of motors is directly connected to the number of movements to be performed in order to carry out the locking and unlocking of a battery. Specifically, one motor will make it possible to carry out a single type of movement chosen from a translational or a rotational movement for example. Thus, if locking requires two types of movement, it will be necessary to provide two motors, if three types of movement are required, three motors will be needed, etc.

Thus, the solution has the advantage of being relatively independent of the number of locks to be actuated. Indeed, the number of motors corresponds to the number of movements to be performed, as was seen above, and toolboxes with one and the same number of motors are suited to actuating battery locking mechanisms involving different numbers of locks. However, should it prove necessary to increase the power available on the toolbox, it is possible to increase the number of motors rather than using more powerful motors, for example to provide two additional motors per movement that is to be carried out. Thus, the toolbox depicted is well suited to actuating 4 to 8 locks.

Likewise, the number of relay gearboxes and movement transmission shafts can vary and is dependent on the number of motors and on the number of actuators. In addition, the number of grasping systems will also be consistent with the number of locks provided for securing the battery of a motor vehicle.

Finally, the specific structure of the toolbox in terms of the number of motors, of movement transmission mechanisms and of grasping systems will in fact be dependent on the mechanism used to lock the battery to the motor vehicle.

Thus, the solution has the following advantages:
- it is suitable for standardization because of its high degree of flexibility through the use of simple standard components suited to performing a multitude of different movements, and because of its low cost;
- it is suited to implementation in a battery-exchange service station because it represents a system with a standard interface and an optimized size;
- it is suited to the creation of a network of universal battery-exchange service stations which can be adapted to the type of vehicle being served.

Figure 5:
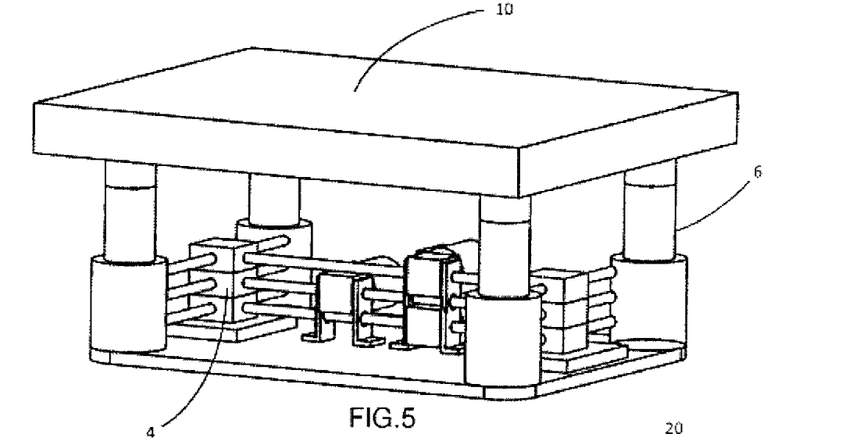
FIG. 5 is a perspective depiction of the connection between a toolbox according to the embodiment of the invention and a battery of a motor vehicle.

FIG. 5 depicts the connection of a toolbox according to the embodiment of the invention with a battery 10. It may be seen that the four locking-mechanism grasping systems 6 connect at their top 11 with corresponding means formed at the battery locks. Actuation of these locking-mechanism grasping systems 6 provides an action on these locks belonging to the battery 10, in order to lock them or unlock them.

Figure 6:
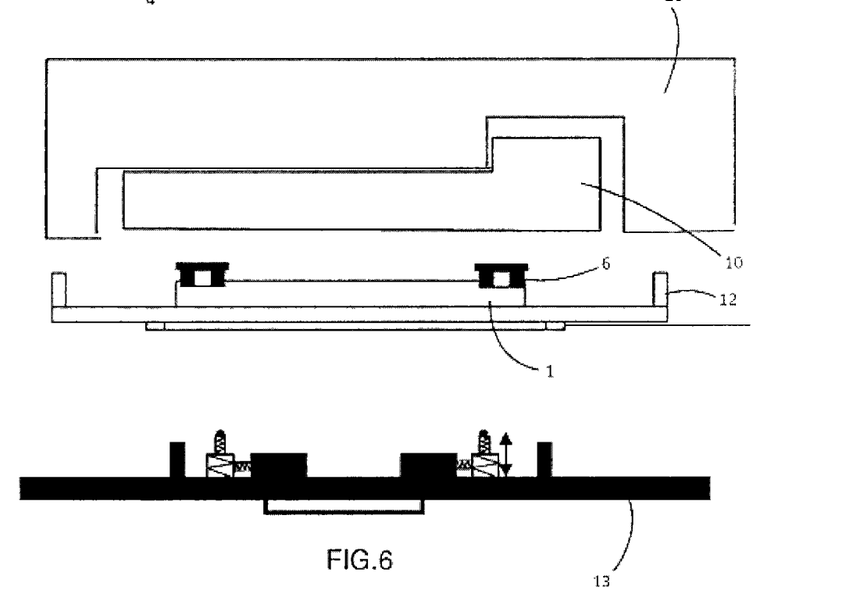
FIG. 6 is a schematic cross-sectional view from the side of the principle of operation of a toolbox according to the embodiment of the invention within a system for locking and unlocking a motor vehicle battery.

FIG. 6 schematically illustrates the use of a toolbox 1 according to the embodiment of the invention within a system for unlocking a battery 10 fixed under a motor vehicle 20. The toolbox 1 comprises locking-mechanism grasping systems 6 protruding at its top and able to act on the locks of the battery 10, as was explained hereinabove. A lifting system 13 for moving and lifting the toolbox 1 is arranged at the exchange station. According to an alternative form of embodiment, it is possible to provide a lifting system that does not have the movement function and is restricted merely to a lifting function. The movement function will then be obtained by a separate movement system capable either of moving the battery that is to be fitted or of moving the vehicle to which the battery is to be fitted. In the embodiment depicted in FIG. 6, this lifting system 13 has the function of transporting the toolbox to the correct location under the motor vehicle to face the battery, then of moving it in the vertical direction in order to bring it into contact or not with the battery. Optional car bearer bars 12 are added to the toolbox to improve the stability and precision of the positioning of the whole. The toolbox in this embodiment is moved by a device of the rollers type operating using conveyor rails. As an alternative, a robot may be used to move a toolbox, the latter then comprising a connection interface, for example in the form of handles for grasping.

As an alternative, the lifting system 13 additionally on its top surface comprises a plate in the middle of which there is a motorized ball end as an interface with the toolbox device 1, the latter in the middle of its support unit 2 having a complementary cavity that fits onto this ball end. Other mechanical connecting elements on the plate of the lifting system 13 and on the bottom surface of the support unit 2 may potentially allow more precise referencing of the toolbox device 1 on the lifting system 13. In this alternative form, the motorized ball end of the lifting system 13 allows the toolbox 1 to be referenced automatically in the horizontal plane under the battery 10 of the vehicle once the toolbox device 1 has been raised to the suitable height by the lifting system 13. More specifically, this horizontal referencing involves bringing the flat surface of the support unit 2 of the toolbox device 1 into a plane parallel with that of the bottom surface of the battery 10.

Figure 7:
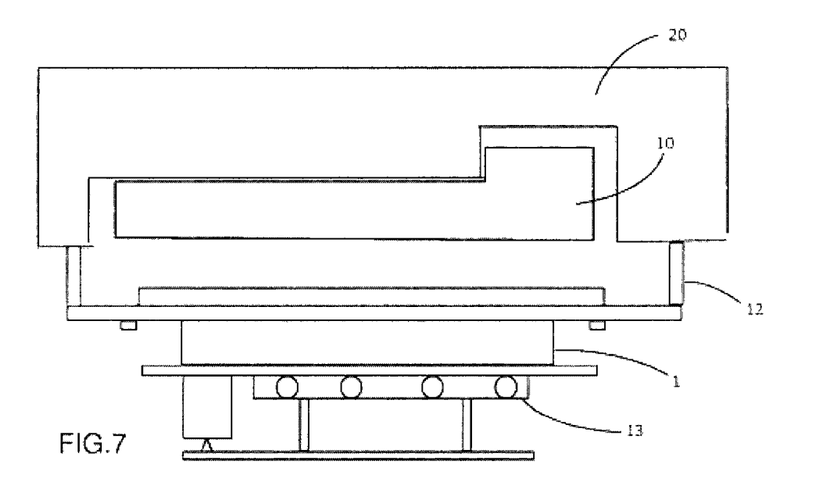
FIGS. 7 to 10 schematically depict various phases of a method for unlocking a battery from a motor vehicle using the toolbox according to the embodiment of the invention.
Figure 8:
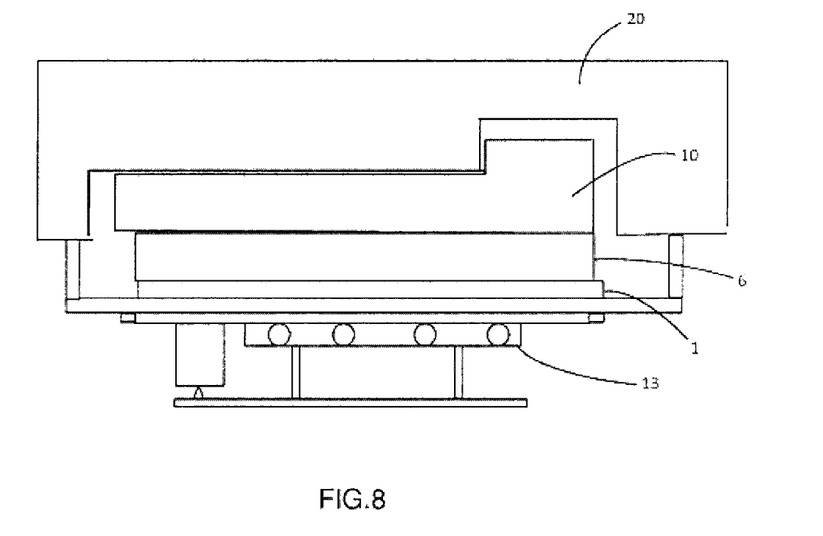
Figure 9:
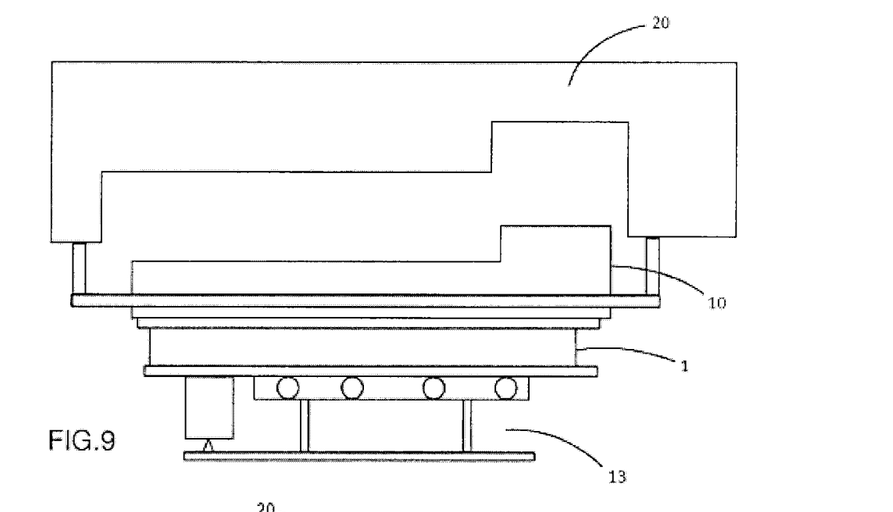
Figure 10:
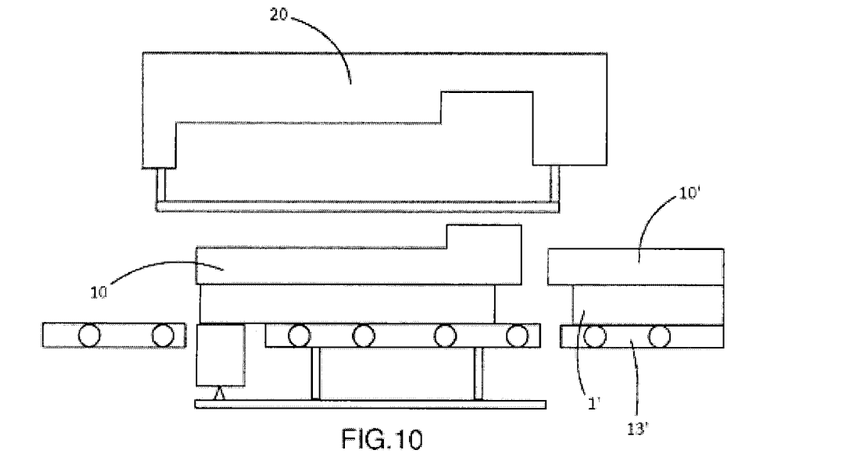

FIG. 7 depicts an initial phase in a method of unlocking a battery 10 from a motor vehicle 20. The movement and lifting system 13 has positioned the toolbox 1 under the battery 10 of the motor vehicle 20. FIG. 8 depicts the next phase in which the lifting system 13 has moved the toolbox 1 upward until it connects with the battery 10, so that its actuators can unlock it, using the operation described hereinabove. FIG. 9 thus depicts the battery 10 unlocked from the motor vehicle, transported away from the motor vehicle by the toolbox 1, which here performs a second function of holding and transporting the battery, in addition to its first function of actuating the locking and unlocking mechanisms. Finally, FIG. 10 depicts the replacing of the empty battery with a fully charged new battery. For that, the movement and lifting system 13 moves the toolbox 1 carrying the discharged battery 10 away horizontally, for example by running along rails, while another lifting system 13' brings in under the motor vehicle another toolbox V carrying a fully charged battery 10', so that it can be positioned and locked in its space provided under the vehicle 20, in a way that is similar to but the reverse of the unlocking method steps described hereinabove.

The invention claimed is:

1. A toolbox device for enacting locking and/or unlocking of a battery that powers a motor that drives a motor vehicle, comprising:
   a planar support unit;
   a plurality of grasping systems to lock and unlock the battery by contacting the battery with a top of each grasping system of the plurality of grasping systems, the plurality of grasping systems being positioned along a periphery of a top surface of the support unit; and
   a movement transmission system attached to the top surface of the support unit and comprising a plurality of motors, a plurality of relay gearboxes, and a plurality of transmission shafts, connected to the plurality of grasping systems such that each motor of the plurality of motors provides movement to all of the grasping systems with respect to the support unit, at least the plurality of motors being positioned in a central area of the top surface of the support unit, the central area where the plurality of motors is positioned is within the periphery where the planarity of gasping systems is positioned such that the plurality of grasping systems contact the battery to hold the battery directly over the central area including the plurality of motors.

2. The toolbox device as claimed in claim 1, wherein the plurality of motors includes two motors.

3. The toolbox device as claimed in claim 1, wherein the support unit is substantially rectangular, the plurality of grasping systems includes four grasping systems positioned in corners of the top surface of the support unit, and at least one motor of the plurality of motors is positioned in a central region of the top surface of the support unit.

4. The toolbox device as claimed in the claim 1, wherein each motor of the plurality of motors provides a different type of movement to all of the grasping systems of the plurality of grasping systems.

5. The toolbox device as claimed in the claim 4, wherein the different types of movement provided by the plurality of motors include translational movement and rotational movement.

6. The toolbox device as claimed in claim 1, wherein
   a first motor of the plurality of motors drives a first transmission shaft of the plurality of transmission shafts,
   a first end of the first transmission shaft is connected to a first relay gearbox of the plurality of gearboxes and a second end of the first transmission shaft is connected to a second relay gear box of the plurality of gearboxes,
   the first relay gearbox is connected to a second transmission shaft of the plurality of transmission shafts, and
   a first end of the second transmission shaft is connected to a first grasping system of the plurality of grasping systems and a second end of the second transmission shaft is connected to a second grasping system of the plurality of grasping systems such that rotation of the second transmission shaft moves the first grasping system and the second grasping system.

7. The toolbox device as claimed in claim 6, wherein
   the second relay gearbox is connected to a third transmission shaft of the plurality of transmission shafts, and
   a first end of third transmission shall is connected to a third grasping system of the plurality of grasping systems and a second end of the third transmission shaft is connected to a fourth grasping system of the plurality of grasping systems such that rotation of the third transmission shaft moves the third grasping system and the fourth grasping system.

8. The toolbox device as claimed in claim 1, wherein the plurality of grasping systems extends further above the top surface of the support unit than the plurality of relay gearboxes, the plurality of transmission shafts, and the plurality of motors.

9. A system for replacing a battery of a motor vehicle, comprising:
   a toolbox device as claimed in claim 1; and
   a lifting system for lifting the toolbox device, allowing the toolbox device to be moved vertically.

10. A station for replacing a battery that powers a motor that drives a motor vehicle, comprising:
    a system for replacing a battery of a motor vehicle as claimed in claim 9.

11. A method for replacing a battery of a motor vehicle, comprising:

positioning a toolbox device as claimed in claim 1 under the battery of a motor vehicle;
lifting the toolbox device vertically until top ends of the plurality of grasping systems of the toolbox device connect with the battery while the top ends are positioned above the plurality of motors, the plurality of relay gearboxes, and the plurality of transmission shafts, the battery being positioned directly over the plurality of motors;
actuating the toolbox device to unlock the battery from the motor vehicle, the actuating including each motor of the plurality of motors providing movement to all of the grasping systems;
lowering the toolbox device bearing the unlocked battery; and
taking the unlocked battery away.

12. The method for replacing a battery as claimed in claim 11, wherein the actuating the toolbox device is preceded by positioning the support unit in a plane parallel to the bottom plane of the battery.

13. The method for replacing a battery of a motor vehicle as claimed in claim 11, further comprising:
positioning the toolbox device bearing a new battery under the motor vehicle;
lifting the toolbox device vertically until the new battery is positioned in a housing provided within the motor vehicle;
actuating the toolbox device to lock the new battery to the motor vehicle; and
taking the toolbox device away.

14. A system for replacing a battery of a motor vehicle, comprising:
a toolbox, comprising:
a support unit,
a plurality of grasping systems to lock and unlock the battery, a top end of each grasping system of the plurality of grasping systems being positioned to connect with locks of the battery and a bottom end of each grasping system of the plurality of grasping systems being positioned directly on a top surface of the support unit, and
a movement transmission system attached to the top surface of the support unit and comprising a plurality of relay gearboxes and a plurality of transmission shafts connected to the plurality of grasping systems; and
a plurality of motors, each motor of the plurality of motors attached to the top surface of the support unit and providing movement to all of the grasping systems with respect to the support unit,
wherein the plurality of grasping systems extends further above the top surface of the support unit than the plurality of relay gearboxes, the plurality of transmission shafts, and the plurality of motors.

15. The system as claimed in the claim 14, wherein each motor of the plurality of motors provides a different type of movement to all of the grasping systems of the plurality of grasping systems.

16. The system as claimed in the claim 15, wherein the different types of movement provided by the plurality of motors include translational movement and rotational movement.

17. The system as claimed in claim 14, wherein
a first motor of the plurality of motors drives a first transmission shaft of the plurality of transmission shafts,
a first end of the first transmission shaft is connected to a first relay gearbox of the plurality of gearboxes and a second end of the first transmission shaft is connected to a second relay gear box of the plurality of gearboxes,
the first relay gearbox is connected to a second transmission shaft of the plurality of transmission shafts, and
a first end of the second transmission shaft is connected to a first grasping system of the plurality of grasping systems and a second end of the second transmission shaft is connected to a second grasping system of the plurality of grasping systems such that rotation of the second transmission shall moves the first grasping system and the second grasping system.

18. The system as claimed in claim 17, wherein
the second relay gearbox is connected to a third transmission shaft of the plurality of transmission shafts, and
a first end of the third transmission shaft is connected to a third grasping system of the plurality of grasping systems and a second end of the third transmission shaft is connected to a fourth grasping system of the plurality of grasping systems such that rotation of the third transmission shaft moves the third grasping system and the fourth grasping system.

* * * * *